US009396048B2

(12) United States Patent
Vongphouthone et al.

(10) Patent No.: US 9,396,048 B2
(45) Date of Patent: Jul. 19, 2016

(54) PROCESS FOR DISPLAYING IN A WEB BROWSER THE RENDERING PRODUCED BY AN APPLICATION

(75) Inventors: Aline Vongphouthone, Geneve (CH); David Faure, Paris (FR); Romain Piegay, Paris (FR)

(73) Assignee: Orange, Paris (FR)

(*) Notice: Subject to any disclaimer, the term of this patent is extended or adjusted under 35 U.S.C. 154(b) by 797 days.

(21) Appl. No.: 12/974,385

(22) Filed: Dec. 21, 2010

(65) Prior Publication Data
US 2011/0214075 A1 Sep. 1, 2011

(30) Foreign Application Priority Data
Dec. 21, 2009 (FR) ...................................... 09 59326

(51) Int. Cl.
*G06F 3/048* (2013.01)
*G06F 9/54* (2006.01)
*G06F 3/01* (2006.01)

(52) U.S. Cl.
CPC . *G06F 9/542* (2013.01); *G06F 3/01* (2013.01); *G06F 2209/545* (2013.01)

(58) Field of Classification Search
CPC ...... G06F 9/542; G06F 3/01; G06F 2209/545
USPC ........................................................ 715/760
See application file for complete search history.

(56) References Cited

U.S. PATENT DOCUMENTS

| 5,542,069 | A  | * | 7/1996 | Meppelink | ............ | G06F 13/105 345/156 |
| 7,171,614 | B2 | * | 1/2007 | Allor | ............................ | 715/205 |
| 2003/0048286 | A1 | * | 3/2003 | Lal | ........................ | G06F 9/4445 715/700 |
| 2004/0061713 | A1 | * | 4/2004 | Jennings | ........................ | 345/700 |
| 2007/0156384 | A1 | * | 7/2007 | Plunkett | ................. | H04L 67/02 703/23 |

(Continued)

FOREIGN PATENT DOCUMENTS

EP 1 310 868 A2 5/2003
WO 03/067568 A1 8/2003

OTHER PUBLICATIONS

"SnagIt 7 Add-Ins—Helpdoc-online", taken from http://en.helpdoc-online.com/snagit_7%20add-ins/source/first.html, published May 11, 2005, 1 page.*

(Continued)

*Primary Examiner* — William Bashore
*Assistant Examiner* — Gregory A Distefano
(74) *Attorney, Agent, or Firm* — Knobbe Martens Olson & Bear LLP

(57) ABSTRACT

A process for displaying—in a web browser of a user computer terminal—the rendering that is produced by an application designed to be executed independently by a computer operating system. This process includes a stage that consists in executing (E22, E23) within the browser a software module that triggers execution (E24, E25) of the application by the operating system of the terminal and implementing, during the execution of the application, stages that consist in:
  detecting (E28) at least one window that is generated by the application and that relates to the rendering generated by the application; and
  for each window that is detected in the preceding stage, rendering the window that is detected hierarchically depending on the software module, in such a way as to redirect (E28) the rendering produced by the application toward a window that is displayed in the browser.

12 Claims, 2 Drawing Sheets

(56) References Cited

U.S. PATENT DOCUMENTS

Figure 1:
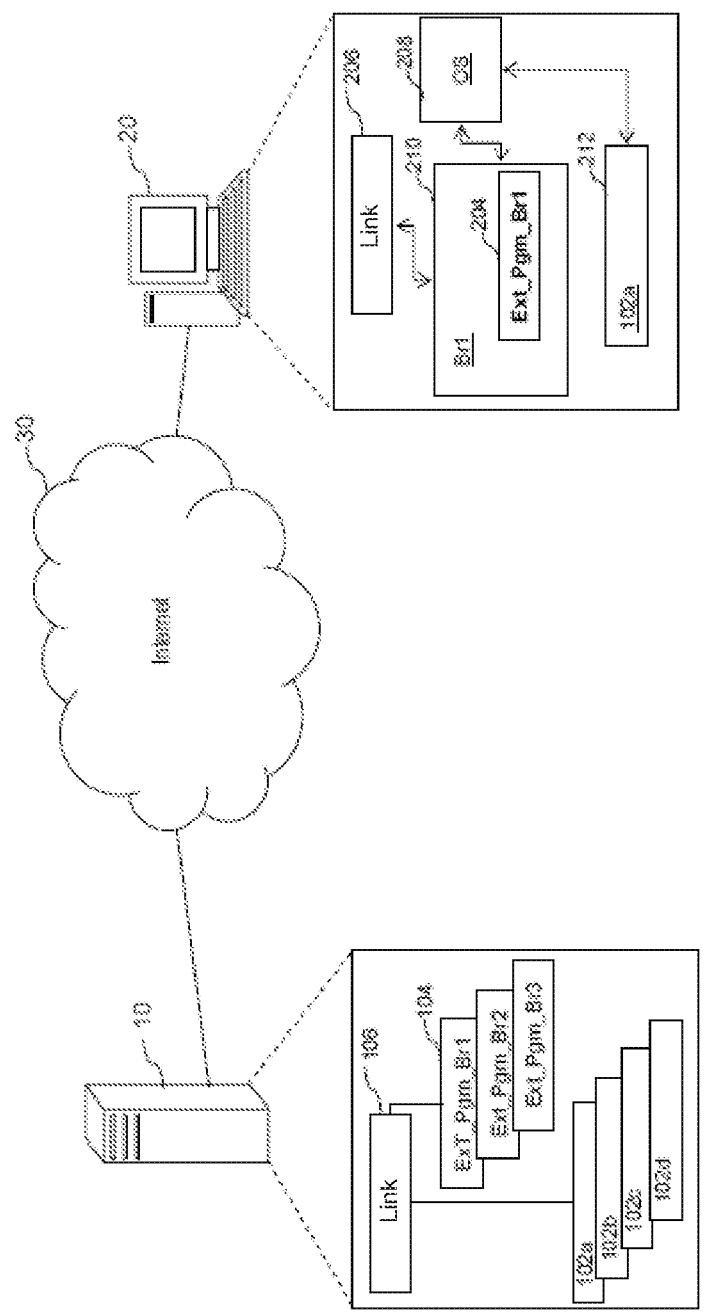

| | | |
|---|---|---|
| 2007/0245353 A1 | 10/2007 | Ben-Dor |
| 2009/0054141 A1 | 2/2009 | Williams et al. |
| 2009/0287772 A1 | 11/2009 | Stone et al. |
| 2010/0153544 A1* | 6/2010 | Krassner ............ G06F 17/2247 709/224 |
| 2012/0317295 A1* | 12/2012 | Baird ................... H04L 67/38 709/228 |

OTHER PUBLICATIONS

French Search Report, Dated Sep. 13, 2010, in FA 733301/FR 0959326.

* cited by examiner

PROCESS FOR DISPLAYING IN A WEB BROWSER THE RENDERING PRODUCED BY AN APPLICATION

This invention relates to the field of applications that are accessible on the Internet from users' computer terminals. In particular, the targeted applications are those that implement virtual environments in three dimensions (3D), such as, for example, those that relate to virtual worlds or games in 3D.

More specifically, this invention relates to a technique for integrating in a web browser the rendering that is produced by an application that is designed to be executed independently by an operating system of a computer terminal.

Virtual worlds have given rise to much interest for several years. Thus, one of the most popular of these virtual worlds is known under the name Second Life™, for which a strong community of users has been developed, and enriches the world of various creations of the users: clothing for avatars, objects, scenery. This active community also organizes events and gathers into groups.

However, even if the creations that are produced and the events that are organized by the users of virtual worlds such as Second Life are noteworthy, they are, nevertheless, confidential, i.e., little known to the general public, and there are at least two reasons for this.

On the one hand, to access a virtual world, the user has to have significant computer resources. Actually, these virtual worlds require cumbersome client applications for calculating in real time the rendering seen by a camera or an avatar of a world whose description is stored on a server.

On the other hand, to access the corresponding graphical application, available on a server of a network such as the Internet, the user has to follow a tedious process:

1/ Going onto the website of the virtual world (for example Second Life);
2/ Registering and obtaining a user name/password;
3/ Finding the download link of the client and clicking on it;
4/ Waiting for the end of the download;
5/ Installing the client;
6/ Launching the client, entering his user name/password;
7/ Going to the location of the network where the graphical object is located that one wishes to see or else the events that one wishes to follow (conference, product demonstration, game, meeting, etc.) or passing through a given link outside of the virtual world—for example in the case of Second Life, by using an address in a particular format (SLURL)—or using the search engine inside the application of the virtual world under consideration.

This difficulty of access is the cause of problems disclosed below.

The virtual world remains "impenetrable" to the users in the sense that, aside from screen copies and videos, the user does not have any grasp of the experience of the virtual world before passing through the downloading and the installation of the cumbersome client.

Furthermore, users can become tired during the installation process or even make mistakes given the complexity of the installation process or else feel lost during the installation, in particular if they are computer novices, and they can consequently interrupt the installation process before it is completed; this therefore leads to the loss of potential users of the virtual world application that is under consideration.

Finally, once the software of the application is downloaded, the user is no longer connected to the website for access to the software. Consequently, the power of the web search tools and ergonomic schemes that are well known on the Internet is not used, to the disadvantage of the user.

Most of the virtual worlds operate according to the same principle. It is also possible to extend the above-mentioned problem set to video games that can be downloaded and executed as a cumbersome client.

3D modeling technologies that propose the access to 3D scenes that are accessible on the Web are known, however, without requiring the installation of cumbersome client software in the client computer system.

These technologies use web browsers that are linked to a specific external software module, commonly called "plug-in" (sometimes referred to as "plugiciel" or "visionneuse," in French), designed to extend, in an external manner, the functionalities of the web browser.

Thus, it is possible to cite the 3D Unity™ software, compatible with the web browsers using its plug-in called Unity Web Player™.

It is also possible to cite the description language VRML (Virtual Reality Markup Language) that makes it possible to show virtual 3D interactive universes. The description files (.wrl) can be downloaded from a web server and displayed using a web browser that is completed by a specific plug-in.

It is also possible to mention the software for creating Virtools™ 3D applications. The Virtools contents can be displayed on the Internet using a specific web browser.

However, each of the technologies above allows the corresponding web browser to display only 3D contents produced by the technology under consideration.

The patent document US2009/0054141A1 describes a system that uses a plug-in that is linked to a web browser for integrating the rendering that is produced by a game application in a window of the browser. According to the system that is described, the plug-in has a game application graphical display module that makes it possible to connect a three-dimensional graphical engine that the graphical application has with a web page display module included in the browser, so as to display views produced by the graphical application in the window of the browser.

Thus, in the above-mentioned technique, taking into account the interaction between the plug-in and the graphical application, the latter is necessarily designed from the outset for operating with the plug-in. The result is that such a plug-in cannot operate with other graphical applications that are not designed for interacting with the plug-in in question.

The object of this invention is to improve the situation disclosed above, relative to the prior art, by proposing a process for displaying—in a web browser of a user's computer terminal—the rendering produced by an application that is designed to be executed independently by a computer operation system (independent or "stand-alone" application, in English).

According to the invention, this process comprises a stage that consists in executing within the browser a software module that triggers execution of the application by the operating system of the terminal and implementing, during the execution of the application, stages that consist in:

Detecting at least one window that is generated by the application that relates to the rendering generated by the application;

For each window that is detected in the preceding stage, rendering the window that is detected hierarchically depending on the software module in such a way as to redirect the rendering produced by the application toward a window that is displayed by the browser.

Owing to the above-mentioned arrangements relative to the detection of windows generated by the application and the redirection of the rendering inside the window of the browser, the application does not require any adaptation or modification of its source code for being able to be executed via a web browser.

In practice, the invention is particularly advantageous within the scope of graphical applications such as three-dimensional (3D) games or else 3D virtual environment applications.

In one embodiment, the execution of said software module is triggered starting from a page that is displayed in the browser, following, for example, an action that is carried out by a user on an element that is displayed in this page. The user thus remains within the context of the browser for triggering the execution of this software module.

In a first variant embodiment, the code of a page that is displayed in the browser contains a tag that identifies said application and can be interpreted by said software module. By simple addition of a tag, it is possible to reacquire the execution by the browser of a dedicated software module, designed to interpret this tag and trigger a related processing function.

In a second variant embodiment, the software module is an extension module that is connected to the browser and loaded during the execution of the browser.

Thus, such an extension module that is connected to the web browser that outfits a user terminal is executed via a standard web browser that outfits the user terminal.

According to one embodiment, each window that is detected is rendered hierarchically depending on the extension module by the execution of a windows management function of the operating system, making the detected window a child of the extension module.

According to a particular characteristic of the invention, the process also comprises stages that consist in:
  Detecting the windows that are generated by the application that relate to events produced by the application that do not relate to said rendering, and
  For each window detected, hiding the display of the window and determining in addition whether an action of a user on an input/output device that outfits the user terminal is expected, and if this is the case, simulating the expected action of the user.

Such windows, whose display is hidden using the execution of the software module, are, for example, windows that are linked to the updating of the application or wait windows ("Splash windows" in English), i.e., windows that prompt the user to wait during the loading and installation of software, while providing him with various information such as the name of the software, the name of the editor, the logo of the editor or of the software, etc., and the state of the loading of the software. In this way, the installation of the application and/or the launching of the application in the user terminal, via the browser, are completely transparent for the user.

In addition, according to another characteristic of the invention, the process also comprises stages that consist in:
  Detecting—during the execution of the application—actions that are implemented by the user via an input/output device and whose object is to modify the display mode of the rendering produced by the application; and
  Implementing the required modification of the display mode.

Such user actions relate to, for example, the maximizing of the graphical view presented by the graphical application and rendered in the window of the browser. Using the above-mentioned characteristic, such display modifications requested by the user are automatically provided, as if the application was executed in independent mode (stand-alone).

According to another characteristic of the invention, the process comprises a stage that consists in capturing a graphical view that is displayed in the window of the browser in response to an action of the user on an element that is displayed in the window of the browser. Thus, the user can locally store images, or image sequences relative to a game or a virtual world, and share them with his social network on the network (Internet).

According to other characteristics of the invention, the software module implements preliminary stages consisting in automatically downloading an installation program of the application from the network in the user computer system, and then in executing the installation program for installing the application in the user computer system.

In an embodiment where the software module is an extension module, the extension module is obtained in advance by downloading from a network to which the terminal is connected, via a web page that is displayed by the browser; in particular, the extension module can be loaded into the browser of the user computer system from the network after it is determined that the browser does not already have the extension module.

Thus, owing to the above-mentioned characteristics, this invention can be advantageously applied to the system for providing graphical applications, such as games, by means of dedicated servers on an Internet-type network, to which the terminal of the user is connected, and the latter can then select—on a web page that is displayed by a web browser—a game to be executed locally directly in the window of the browser and in a manner that is totally automated and is transparent to it.

In practice, the extension module that is connected to the browser of the user terminal is a plug-in-type software module. Using such an extension module, a graphical application that can be downloaded from a server to the Internet and designed to operate independently on a user computer, for example a PC, can be executed directly from a web page that is displayed by the browser of the user computer.

Consequently, according to a second aspect, the invention relates to a software module for a web browser, noteworthy in that it comprises program instructions that are suitable for the implementation of a process according to the invention as disclosed briefly above, when this software module is executed by a web browser that outfits a computer system.

Likewise, the object of the invention, according to a third aspect, is a user computer terminal that comprises a web browser that is outfitted with a software module according to the invention.

More specifically, the invention relates to a user computer terminal that is outfitted with a web browser within which is executed a software module that is suitable for:
  Triggering an execution, by the operating system of the terminal, of an application that is designed to be executed independently by a computer operating system, and for implementing, during the execution of the application, stages that consist in:
  Detecting at least one window that is generated by the application and that relates to the rendering generated by the application;
  For each window detected in the preceding stage, rendering the window that is detected hierarchically depending on the software module so as to redirect the rendering produced by the application toward a window that is displayed by the browser.

The advantages that are obtained by the above-mentioned extension module or the computer terminal are identical to those mentioned above in connection with the process, according to the invention, for displaying the rendering produced by an application in a web browser.

Figure 2:
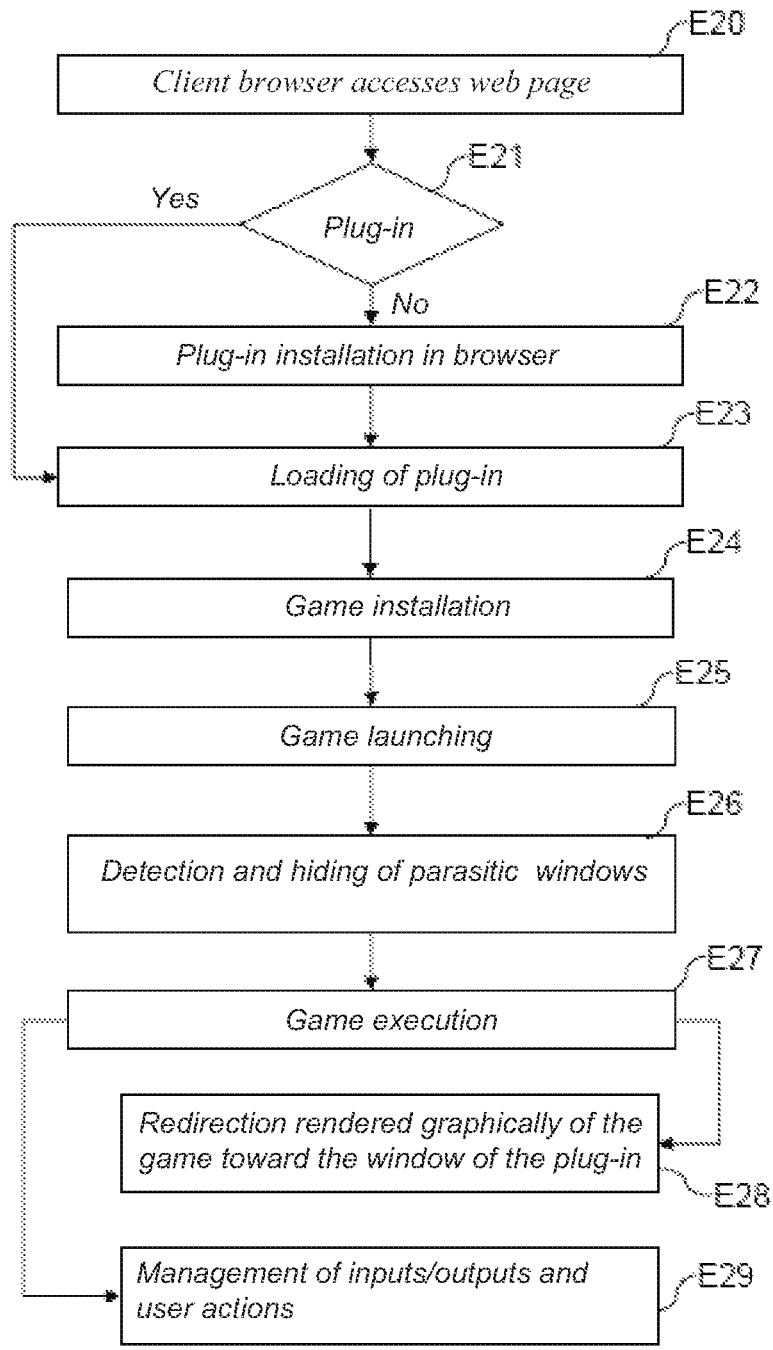

The invention will be better understood using the following detailed description, given with reference to the accompanying drawings, in which:

FIG. 1 shows a system for providing graphical applications of games on an Internet-type network, in which this invention can be implemented; and FIG. 2 is a flow chart that illustrates the primary stages of a process, according to the invention, for integrating the rendering produced by a graphical application in a web browser.

In the sample embodiment of the invention, described below, the invention is implemented in a client-server environment as illustrated by FIG. 1, and the software module is implemented in the plug-in-type extension module form.

FIG. 1 more particularly shows a system for providing applications, in particular graphical applications of games on an Internet-type network 30. The system for providing games consists of, on the one hand, one or more servers 10 that are connected to the network and that propose graphical applications to download, for example, games, and, on the other hand, user terminals 20 that can be connected to the network 30.

As shown in FIG. 1, the user terminals 20, also designated by client terminals, can be PC-type personal computers, but also personal digital assistants (PDA) or mobile telephony terminals, able to be connected to the Internet. The Internet network 30 can be accessible directly or else through stationary or mobile telephony networks, for example a stationary telephony network that uses ADSL technology or else a third-generation mobile telephony network (UMTS).

The server 10 offers for downloading graphical applications 102a-d, such as three-dimensional (3D) games, or else 3D virtual world applications. For this purpose, the server 10 uses a communication module 106 of the type that is known in the art, making possible the communication of data to the network as well as the publication of a web site for downloading graphical applications.

According to one embodiment of the invention, the server 1 provides—for downloading—a set 104 of software modules, each in the form of an extension module Ext_Pgm_Br1, 2,3 according to the invention, each designed for extending the functionalities of a web browser of a specific type denoted Br1,2,3. Such an extension module is also named "extension program" in this document.

Thus, for example, for the web browser known under the name Firefox™ of the Mozilla Company, the corresponding extension module can be in the form of a Firefox plug-in. For the web browser that is known under the name of Internet Explorer™ of the Microsoft Company, the extension module can be in the form of an ActiveX™ module. Of course, specific extension modules for other browsers can be implemented according to the invention, in particular for the browsers that are known under the following names: Opera™, Safari™, Konkero™.

Still in FIG. 1, a user or client terminal 20, here a personal computer (PC), is connected to the Internet network 30 by means of a communication module 206 of the type that is known in the art, and it uses a Br1-type web browser 210, connected to the communication module 206 for being able to consult web sites on the network and to load corresponding web pages thereon. The operation of the user terminal 20 is managed by an operating system OS 208. By way of example, in the example presented, the operating system is Windows™. The operating system 208 controls the execution of the web browser 210 as well as that of a game program 212 that is installed on the hard disk (not shown) of the user terminal. The game program 212 is an independent-type (stand-alone) graphical application 102a that is obtained in advance by downloading from the game server 10.

In addition, according to the invention, the browser 210 of the terminal 20 is outfitted with the extension module 204 "Ext_Pgm_Br1" that is designed for the type, Br1, of its browser. The extension module 204 has been obtained by, for example, downloading from the server 10.

According to the invention, the execution of the extension module 204 by the browser 210 of the terminal 20 ensures the redirection of the rendering produced by an application toward a window of the browser 210. Rendering refers here to the user interface data that are generated by the application and that are designed to be displayed in a window of a user interface of the application.

Usually, such a user interface being a graphical user interface, "graphical rendering" generated by the application will be mentioned here, and the application will be referred to as "graphical application." However, the invention can be applied to any type of user interface, i.e., also to the case where this user interface would consist of a simple textual interface.

In the case of an application in video game form, the rendering that is produced by this application comprises the data of an audio/video stream produced by this application. The rendering produced by an application can comprise both graphical elements that are used as interaction elements as well as images, drawings, sound content, text, etc.

The implementation of a process, according to the invention, for integrating—in a web browser of a user computer terminal—the graphical rendering produced by a graphical application, in a network system such as the one disclosed above, will now be presented in detail in connection with the flow chart that is shown in FIG. 2, which shows the essential stages of a process according to the invention.

As shown in FIG. 2, during a first stage E20, the user connects via the web browser 210 that outfits his terminal 20 to the web site of the graphical application server 10; in other words, the browser loads and displays a web or html page of the web site in question.

Next, the user selects (stage not shown), for example, the game 102a by clicking on the web page that identifies a game that he wishes to play.

In response to the selection, the code of the displayed html page, executed by the browser, triggers the test (stage E21) of a library that is connected to the browser for determining whether the browser is outfitted with the extension module that is necessary for executing the game selected through the browser. For this purpose, the web page that is loaded from the web site of the server contains the necessary tags for calling the required extension module.

Thus, if the browser is Internet Explorer, the extension module can be an ActiveX module that is called in the html page using the tag OBJECT. An ActiveX module is an OCX (OLE (Object Linking and Embedding) Control Extension)-type file, able to be installed by the browser via an archival file.

If the browser is Firefox, the extension module can be a plug-in module that is integrated in the html page by means of an EMBED tag. A plug-in is a DLL file that can be installed by Firefox via an XPI archive that contains an INSTALL.RDF file. This RDF file describes information such as the version and the url for updating the plug-in. An example of HTML code for calling the Firefox plug-in is provided below.

```
<embed id="testing" width=640 height=480
type="application/gameverse-plugin-test
gameId="1"
PLUGINspage="http://p-
18bdaa.rd.francetelecom.fr/gameverse_plugin_test/viewer.xpi
"
</embed>
```

The installation and the use of plug-in modules or ActiveX by web browsers are operations that are known in the art and will consequently be presented in very little detail.

Returning to FIG. 2, during the test E21, if the extension module (plug-in) is not already installed or else if it is to be updated (E21, no), it is automatically installed or updated (E22) in the browser of the user terminal, from the network; then, the extension module is loaded by the browser in the stage E23 that follows. Otherwise (E21, yes), the plug-in is directly loaded (E23) by the browser.

Next, the following stages are implemented by the execution of the instructions that are contained in the extension module.

Thus, in the following stage (E24), before installing the graphical application, the extension module begins by verifying whether the application is already installed in the user computer system. For this purpose, the following functions of the programming interface (API—Application Programming Interface) of the Windows operating system, commonly called "methods," are called:

```
RegCreateKey
RegQueryValueEx
RegCloseKey
```

If the graphical application is not already installed, its installation is then automatically initiated. For this purpose, the extension module downloads the list of servers onto the network from which the graphical application can be downloaded—these servers are conventionally referred to as "mirror" servers—and then selects a server and downloads a program for installation of the graphical application.

For this purpose, the following methods of the Windows API are used:

```
InternetOpenUrl
InternetReadFile
```

Next, the CreateProcess method of the Windows API is used to launch the installation program in the user terminal. The installation of the game is then automatically carried out, without intervention from the user, in the following manner.

The extension module begins by identifying the Windows window, which corresponds to the installation program, by using the FindWindow method of the Windows API. The identified window is then hidden, i.e., made invisible, by using the SetParent HWND_MESSAGE method of the API. Next, the extension module hides the installation program dialogue—user, and responds instead of the user, by first identifying the buttons to click that are displayed by the installation program, by browsing in the tree structure of the sub-windows generated by the installation program, and then by simulating the click or the clicks of the mouse expected by the installation program. For this purpose, the following methods of the Windows API are used:

```
GetWindow GW_CHILD GW_HWNDNEXT
SendMessage WM_LBUTTONDOWN
SendMessage WM_LBUTTONUP
```

Once the graphical application is installed (one game, in the example that is described), it is automatically launched (stage E25) by the operating system (Windows). For this purpose, the extension module uses the CreateProcess method of the Windows API.

In the following stage, E26, the extension module detects and hides the appearance of parasitic windows that appear during the loading of the graphical application.

Actually, during the launching of the graphical application, the program of the graphical application can conventionally ensure the display of windows relative to the updating of the graphical application. A program during loading, such as a game, also conventionally displays windows, referred to in English as splash windows, which are linked to the progression of the loading of the game or else display information relative to the game, such as the version or the name of authors. The above-mentioned windows, which do not relate to the rendering of graphical data generated by the graphical application, are considered to be parasitic windows within the scope of this invention, and thereby, according to the invention, they are detected and then hidden.

For the detection of windows, the method of the above-mentioned Windows API, FindWindow, is used.

When the detected window is a wait window (splash window), the latter is hidden by using the SetParent HWND_MESSAGE method of the Windows API. When it involves a window for updating the game, the window is hidden by again using the SetParent HWND_MESSAGE method of the Windows API.

Next, the extension module detects and hides, if necessary, the appearance of a window that asks the user to trigger the execution of the graphical application; it generally involves a "play" button for a game. The extension module then detects that the "play" button is active by using the method of the Windows API IsWindowEnabled, and then simulates the click of the mouse on the "play" button by using the following two methods:

```
SendMessage WM_LBUTTONDOWN
SendMessage WM_LBUTTONUP
```

In the following stage E27, the graphical application (game) is now in execution phase.

According to the invention, during the execution of the graphical application, as illustrated by stage E28, the extension module detects at least one or all of the windows that are generated by the graphical applications that relate to the graphical rendering that is generated by the application. Then, for each window that is detected, the extension module uses a windows management function of the operating system for making the window that is detected a child of the extension software module so as to redirect the graphical rendering that is produced by the graphical application toward a window of the browser.

In practice, each window that is generated by the graphical application is detected by using the FindWindow method of the API of the Windows operating system. Next, the detected window is rendered hierarchically depending on the extension module. According to the embodiment that is described, the extension module calls the "SetParent" method of the Windows API for making the window that is detected a child of the extension module.

Next, the size of the detected window of the game is adapted to the window that is generated by the extension module (plug-in) inside the window of the browser. For this purpose, the MoveWindow method of the Windows API is used.

During the execution of the graphical application, as shown by the stage E29 in FIG. 2, the actions that are carried out by the user via an input/output device, such as a keyboard or a mouse, are detected by the extension module. When the detected actions have an influence on the display of graphical data produced by the graphical application, their processing is then adapted to the display in the window that is generated by the extension module. In particular, when one action aims to modify the display of the graphical data, the extension module is adapted to implement the required display modification.

Thus, when actions using the keyboard are involved, the corresponding events are captured by the use of the GetKeyState method of the Windows API. In addition, in the case where the detection action of the user aims at the maximizing of the display, the extension module then uses the SetParent method of the Windows API to make the window that is generated by the graphical application a child of the office, i.e., the visible workspace when no window has been opened or they have all been minimized. Next, the title bar of the window is hidden, and the size of the window is maximized to the size of the display screen.

In the case in particular where the graphical application is a 3D game or a virtual world application, the user may desire to back-up views that are generated by the application to store them locally and to share them with a social network on the network (Internet). For this purpose, an extension module according to the invention is suitable for capturing a view or a sequence of graphical views displayed in the window of the browser in response to an action of the user on an element that is displayed in the window of the browser (click of the mouse, for example).

Furthermore, an extension module according to the invention can contain call instructions of traceability functions relative to the use, by users, of the graphical application whose rendering is managed by the extension module in question.

Thus, in the case of the web site of a server that proposes community-dimension games, it is possible to consider, with the proviso of the agreement of the users, that information such as "14:03, John is playing game X" can be collected and transferred to the server, for example to be transmitted to other members of the communities of players and/or to be used for purposes of calculating statistical guidelines whose purpose is to evaluate the conditions of use of the game by the users.

In a general manner, an extension module according to the invention can be easily enriched with new functions that are suitable for the execution of a particular graphical application. Thus, it is possible to provide a generic extension module that can redirect the rendering of any graphical application toward a browser window and that can add particular functions that are designed to improve the treatment that is carried out by the extension module based on specific needs relative to a given graphical application, for example a game.

By way of example, in the case in particular where the window that is generated by the extension module, inside the window of the browser, occupies only a portion of the window of the browser, it is possible to make the window of the game active in a programmed manner when the cursor that is connected to the mouse passes over the window.

For this purpose, it is possible to use the GetForegroundWindow method of the Windows API for detecting the active window. Then, if the window of the game inside the window of the browser is not the active window, it is possible to activate it by detecting that the cursor of the mouse passes over the window of the game. For this purpose, it is possible to use the function of the Windows API WindowFromPoint. This function requires the preliminary recovery of the position of the cursor within the frame of reference of the game; for this purpose, it is possible to use the GetDeviceState function of the DirectInput API, which is an API of the DirectX™ suite from Microsoft.

The preceding detailed description relates to a nonlimiting example of the embodiment of the invention, in which the network is the Internet, the extension module is a plug-in-type module (for example, ActiveX), and the operating system of the user terminal is Windows.

However, this invention is in no way limited to a particular operating system that outfits a user terminal that is under consideration, nor to a particular type of extension module, as well as to a particular type of client-server network.

Furthermore, this invention is not limited to graphical applications such as games, but can also be applied to any type of software applications that are designed to operate independently and whose execution produces the display of rendering data in a user interface window. In particular, the invention can be used with office automation applications, such as the office automation Office™ suite from Microsoft. It would also make it possible in particular to add functionalities that are related to these applications such as collaborative tools (chat, VoIP), sharing of screen captures or videos, on-line help, . . . .

Also, and so as to simplify the user experience, photographic processing applications such as Photoshop™ of the Adobe Company or audio applications such as Audacity® could be loaded directly into the browser when the user desires to edit a file from a web site.

Finally, all of the programs that require installation or unzipping on the terminal of the user could always display the status of progress of the installation/unzipping directly in the web environment in such a way that the user would then no longer need to leave this environment to initiate this installation/unzipping.

The invention was described in detail above in the case of an example of a first variant embodiment where the software module is produced in the form of a plug-in-type extension module.

According to a second variant embodiment, the development of an extension module is avoided in the following manner:

On the one hand, by integrating a particular HTML tag that identifies the application into the HTML code of the web page from which the execution of the application is to be triggered, On the other hand, by integrating a software module directly into the browser, whereby said module is suitable for interpreting such an HTML tag and for triggering the execution by the operating system of the application that is identified by this tag.

Such an HTML tag is, for example, a tag of the type "<application id="{application_id}" arg=[ . . . ] . . . />, where "{application_id}" is an identification of the application, and "arg=[ . . . ] . . . /" represents the possible parameters of this tag.

Such a software module is designed for, in the case of the presence of such a tag in a Web page that is loaded into the browser, implementing the function or functions associated with this tag, i.e., the functions that are described above for the extension module, and in particular executing the stages that consist in:

Detecting at least one window, generated by the application that is identified in the tag, a window that relates to the rendering generated by the application;

For each window detected, rendering the window that is detected hierarchically depending on the software module, in such a way as to redirect the rendering produced by the application toward a window that is displayed by the browser.

Consequently, the invention is implemented by executing a software code, no longer contained in a specific plug-in to download and to execute by the browser, but integrated directly into the software code of the browser. This solution offers the advantage of enriching the possibilities of the browser and primarily facilitating the web page design since the integration of a tag of the type mentioned above in one page will make it possible to trigger the execution of the software module that is described.

Two embodiments are possible relative to the triggering of the software module. In a first embodiment, the execution of the software module is triggered automatically by the browser as soon as a web page that is loaded by this browser contains such a tag. In a second embodiment, the execution of the software module is triggered following a predefined action carried out by a user on such a web page.

The invention claimed is:

1. A process for displaying, in a web browser of a user computer terminal, rendering that is produced by an application that is designed to be executed independently by a computer operating system, the process comprising executing within the browser a software module that triggers execution of the application by the operating system of the terminal and implementing, during the execution of the application, a procedure comprising:

detecting at least one window that is generated by the application and that relates to the rendering generated by the application; and for each window that is detected, rendering the window that is detected so that it is hierarchically dependent on the software module, in such a way as to redirect the rendering produced by the application toward a window that is displayed in the browser;

detecting at least one window that is generated by the application that relates to events that are produced by the application that do not relate to said rendering; and for each window detected, hiding the display of the window and determining in addition whether an action of a user on an input/output device that outfits the user terminal is expected, and if this is the case, simulating the expected action of the user.

2. The process according to claim 1, wherein said software module is an extension module of the browser.

3. The process according to claim 1, wherein the execution of said software module is triggered from a page that is displayed in the browser.

4. The process according to claim 3, wherein the code of the page that is displayed in the browser contains a tag that identifies said application and that can be interpreted by said software module.

5. The process according to claim 2, wherein each window that is detected is rendered hierarchically depending on the software module by execution of a windows management function of the operating system, making the detected window a child of the extension module.

6. The process according to claim 1, further comprising:

detecting during the execution of the application actions that are implemented by the user via an input/output device and whose purpose is to modify the display mode of the rendering produced by the application; and implementing the modification of the required display mode.

7. The process according to claim 1, further comprising capturing a graphical view that is displayed in the window of the browser in response to an action of the user on an element that is displayed in the window of the browser.

8. The process according to claim 1, wherein the software module implements a preliminary process comprising:

downloading from the network a program for installing the application in the user computer system, and executing the installation program for installing the application in the user computer system.

9. The process according to claim 2, wherein the extension module is obtained in advance by downloading via a network to which the terminal is connected, via a web page that is displayed by the browser.

10. The process according to claim 2, wherein the extension module is a plug-in-type program.

11. A software module for a web browser, comprising programming instructions for implementing a process according to claim 1 when said software module is executed by a web browser that is hosted on a computer system.

12. A user computer terminal comprising a web browser which comprises a software module which, when executed by said computer terminal:

triggers execution, by the operating system of the terminal, of an application that is designed to be executed independently by a computer operating system, and for implementing, during the execution of the application, a procedure comprising:

detecting at least one window that is generated by the application and that relates to rendering generated by the application; and for each window detected, rendering the window that is detected so that it is hierarchically dependent on the software module so as to redirect the rendering produced by the application toward a window that is displayed by the browser;

detecting at least one window that is generated by the application that relates to events that are produced by the application that do not relate to said rendering; and for each window detected, hiding the display of the window and determining in addition whether an action of a user on an input/output device that outfits the user terminal is expected, and if this is the case, simulating the expected action of the user.

* * * * *